(12) United States Patent
Di et al.

(10) Patent No.: US 10,025,519 B1
(45) Date of Patent: Jul. 17, 2018

(54) DATA-DRIVEN ONLINE STORAGE RECONFIGURATION

(71) Applicant: EMC Corporation, Hopkinton, MA (US)

(72) Inventors: Jieming Di, Beijing (CN); Yu Cao, Beijing (CN); Hui Liu, Westborough, MA (US); Lihong Li, Westborough, MA (US); Devanjan Sarkar, Nashua, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 190 days.

(21) Appl. No.: 14/865,392

(22) Filed: Sep. 25, 2015

(51) Int. Cl.
*G06F 3/06* (2006.01)
*G06F 13/16* (2006.01)
*G06F 17/30* (2006.01)
*G06F 13/40* (2006.01)
*G06N 3/12* (2006.01)

(52) U.S. Cl.
CPC ............ *G06F 3/0631* (2013.01); *G06F 3/067* (2013.01); *G06F 3/0608* (2013.01); *G06F 3/0689* (2013.01); *G06N 3/126* (2013.01)

(58) Field of Classification Search
CPC .... G06F 3/0631; G06F 3/0683; G06F 3/0685; G06F 3/0689; G06F 3/0653; G06F 3/067; G06F 3/0608; G06N 3/126

USPC .......................................................... 709/221
See application file for complete search history.

(56) References Cited

U.S. PATENT DOCUMENTS

| | | | | |
|---|---|---|---|---|
| 2010/0106933 | A1* | 4/2010 | Kamila ................. | G06F 3/0605 711/171 |
| 2015/0286409 | A1* | 10/2015 | Chandra ............... | G06F 3/0604 711/170 |
| 2016/0048355 | A1* | 2/2016 | Iliadis .................. | G06F 3/0607 711/171 |
| 2016/0092134 | A1* | 3/2016 | Raitto .................. | G06F 3/0673 711/118 |
| 2016/0283139 | A1* | 9/2016 | Brooker ............... | G06F 3/0619 |

* cited by examiner

*Primary Examiner* — Ruolei Zong
(74) *Attorney, Agent, or Firm* — Daly, Crowley, Mofford & Durkee, LLP

(57) ABSTRACT

In one aspect, a method includes performing a reconfiguration process to reconfigure storage usage. The reconfiguration process includes selecting a subset of solutions from a user-shaped solution space, determining a cost value of each solution in the subset using a cost function, executing a cost-based reconfiguration generation based on a customized genetic process where each reconfiguration solution is treated as a genome, selecting genomes using the cost function as a next generation and repeating the executing.

20 Claims, 3 Drawing Sheets

US 10,025,519 B1

DATA-DRIVEN ONLINE STORAGE RECONFIGURATION

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements (e.g., disk drives). The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

In one aspect, a method includes performing a reconfiguration process to reconfigure storage usage. The reconfiguration process includes selecting a subset of solutions from a user-shaped solution space, determining a cost value of each solution in the subset using a cost function, executing a cost-based reconfiguration generation based on a customized genetic process where each reconfiguration solution is treated as a genome, selecting genomes using the cost function as a next generation and repeating the executing.

In another aspect, an apparatus includes electronic hardware circuitry configured to perform a reconfiguration process to reconfigure storage usage. The circuitry includes circuitry configured to select a subset of solutions from a user-shaped solution space, determine a cost value of each solution in the subset using a cost function, execute a cost-based reconfiguration generation based on a customized genetic process where each reconfiguration solution is treated as a genome, select genomes using the cost function as a next generation and repeat the executing.

In a further aspect, an article includes a non-transitory computer-readable medium that stores computer-executable instructions. The instructions cause a machine to perform a reconfiguration process to reconfigure storage usage. The instructions include instructions causing the machine to select a subset of solutions from a user-shaped solution space, determine a cost value of each solution in the subset using a cost function, execute a cost-based reconfiguration generation based on a customized genetic process where each reconfiguration solution is treated as a genome, select genomes using the cost function as a next generation and repeat the executing.

DETAILED DESCRIPTION

Figure 1:
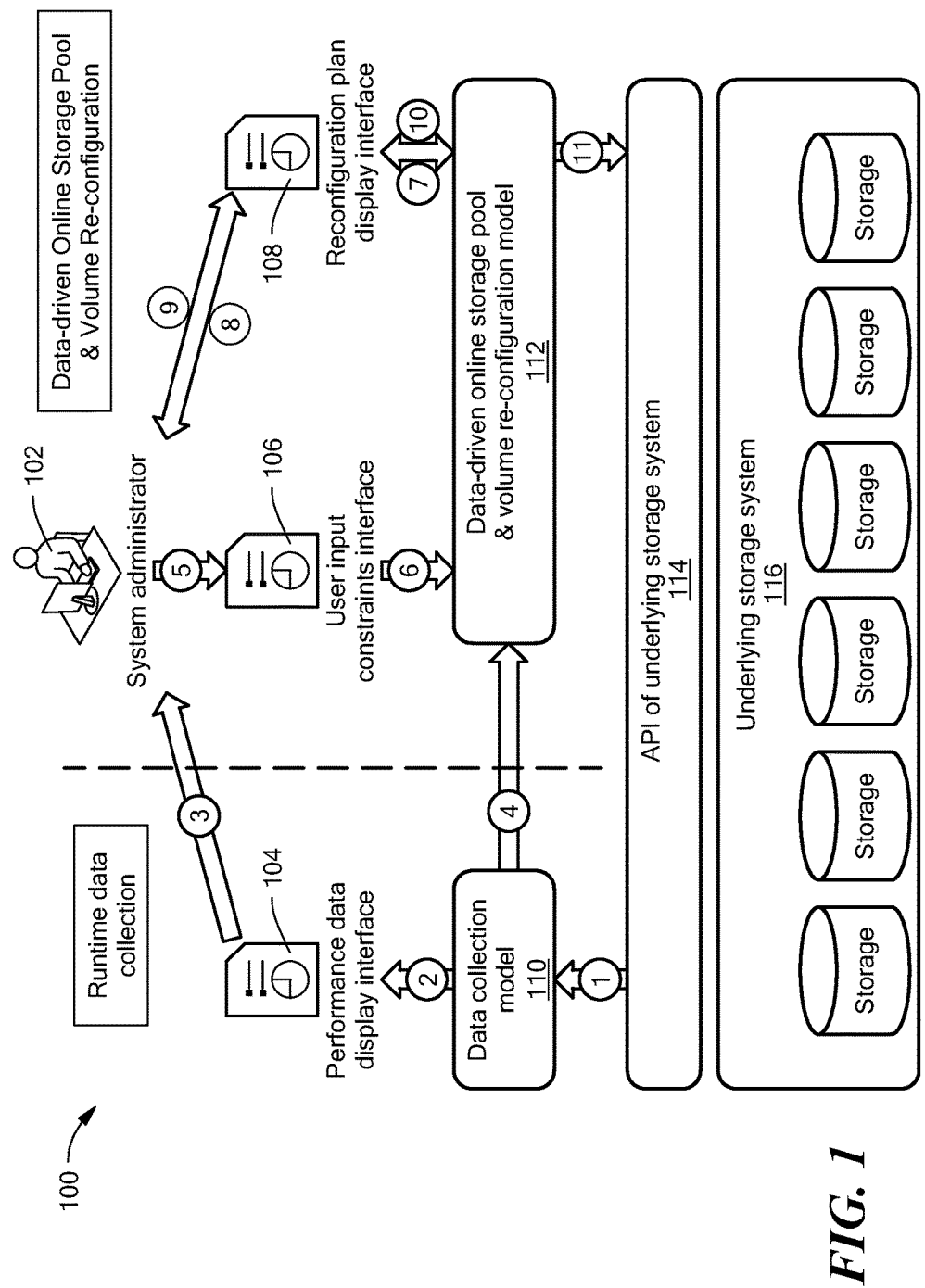
FIG. 1 is a block diagram of an example of system architecture and workflow for data-driven online storage resource reconfiguration.

As described herein, a data-driven model is used to re-configure the storage pools and volumes in storage systems at runtime. For example, performance data (capacity, IOPs, latency, and so forth) is collected and analyzed in a runtime environment. A reconfiguration plan may be provided to system administrators with their pre-defined constraints to achieve efficient usage of storage resources in storage systems.

Data in data centers has been growing very fast in the last decade. Usually, storage resources for applications are allocated at the same time when the applications are initialized, whereas the storage requirements of applications are always changing when they are running. Sometimes the underlying storage pools and volumes would not be able to satisfy applications' SLOs at runtime, and therefore need to be reconfigured. So it is important to have a dynamic, efficient and effective way to reconfigure the underlying storage resource allocation among applications and rebalance the storage system at runtime.

The traditional way to solve this storage resource reconfiguration problem is to rely on system administrators, which imposes high demands and requirements on the domain knowledge and experience of system administrators. There are also some automated methods to mitigate the issues, some of which are totally policy-based, and the others either focus on balancing memory usage or CPU usage at runtime, or focus on rebalancing the users' requests at application level. Nevertheless, all of these methods have some flaws.

First, the effectiveness of manual reconfiguration decisions is largely affected by the domain knowledge, experience and even working status of the administrator. Administrators with different levels of capabilities would also result in different levels of effectiveness of storage resource reconfiguration tuning, which brings uncertainties and risks to the current system. Equivalently important is the fact that a seasoned administrator with good resource (re)configuration skills is really rare and expensive.

Second, policy-based reconfiguration engine can automatically generate a specific reconfiguration solution according to the pre-defined polices. However, there is no guarantee that the solution is an (near-)optimal one, because the solution will only exactly match the pre-defined polices while to a large extent disregarding the actual runtime conditions. Moreover, there is no way for the administrator to predict the effectiveness of the resulted reconfiguration solution.

Third, during the reconfiguration solution generation by existing automated policy-based methods, there is no way for the administrators to input their domain knowledge, best practices and any other governance rules, which would facilitate generating a better reconfiguration solution faster. After all, the administrator knows the underlying storage system well and he is the recipient of any additional governance rules that would be imposed on the system.

The techniques described herein rely on the real-time performance data to generate re-configuration plan. Runtime performance data is collected from underlying storage system and store them in a data store. The performance of a system is always changing, so the data collection model acquires performance data from storage system continuously and with regular time intervals. Such data will be fed into the system to generate reconfiguration solutions, but could also help administrators to better understand the real-time performance of the entire system.

User interfaces are provided to allow system administrators to input constraints on the generated reconfiguration solutions. The constraints encode administers' domain knowledge, best practices and governance rules. In general, these constrains could be separated into two categories:

The first category is constraints applicable to applications. For example, "application A could not be put into storage pool 1" or "application A must be put into storage pool 2". The second category is constraints applicable to storage pools or volumes. For example, "the capacity in each storage pool should be at the same utilization rate" or "storage pool 1 should achieve 80% usage of capacity".

First, the storage reconfiguration problem is defined and its solution space which is shaped by user-defined constraints.

Suppose there will be n storage pools/volumes, m applications and k user-defined constraints. In a possible storage reconfiguration solution, each application is mapped to a dedicated storage pool/volume, and the mapping relationship from application to storage is n:1. For a storage reconfiguration solution to be feasible, it is required that for applications mapped to a common storage pool/volume, their aggregated storage resource requirements, which could be multi-dimensional (capacity, IOPs, latency, and so forth), should not exceed the storage resource capabilities of the storage pool/volume. Moreover, a feasible storage reconfiguration solution should also not violate the user-defined constraints.

The original solution space is defined as the collection of all feasible reconfiguration solutions satisfying applications' aggregated storage resource requirements on each storage pool/volume.

A user-shaped solution space is defined as the original solution space excluding all solutions violating the user-defined constraints. For example, when the system administrator inputs a specific constraint saying that "application A must be put into storage pool 2", the shaped solution space will exclude all solutions where application A is not put into storage pool 2.

Essentially, the best-fit reconfiguration solution needs to be found that falls into the user-shaped solution space. Note that as m and n are fast growing in real environments, both the original solution space and user-shaped solution space are growing exponentially, and it is impossible or impractical to go through all possible solutions and find out the optimal one. And this problem is a typical NP problem which means there is no-polynomial solution for it. As such, our approach is to find a near-optimal solution with reasonable time.

There are two alternative methods to achieve this goal. The first method is to first explore the original solution space and retrieve the top-k solutions, and then check these solutions against the user-defined constrains and select a feasible solution with the highest-rank. The second method is to first apply the user-defined constraints to the original solution space and obtain a user-shaped solution space, and then explore the user-shaped solution space to find the near-optimal solution.

A cost-based reconfiguration process is a customized genetic process to find the near-optimal solution with reasonable time and follows the second method of guided solution space exploration.

In the cost-based reconfiguration process, every single reconfiguration solution is treated as a genome, and every application-to-pool/volume mapping is a gene. In each generation, cost-based re-configuration randomly chooses a subset of certain number(s) of solutions from the user-shaped solution space as a species, and uses the cost function to calculate the cost value for each solution in the subset. After the cost-based reconfiguration process chooses the best a of genomes to hybridize, the cost-based reconfiguration process chooses b of genomes to mutate, and then puts them back into the species. Now that the total number of species is larger, the cost-based reconfiguration process uses a cost function to calculate the cost value of each genome again and sorts them out by their cost value, and chooses the top s of genomes as the next generation, and repeats the above steps. When the change of cost value is small enough, the cost-based reconfiguration process stops and returns the best solution in current generation. Note that in the first generation, besides the randomly chosen subset of s solutions, the species also include the resource allocation scheme deployed at the moment when the reconfiguration process is triggered.

In the following, storage pools are used as an example to explain the cost-based reconfiguration process details, which is obviously applicable to storage volumes as well.

There are a couple of parameters need to be pre-defined. First, a population size is the size of the species. If it is set to a large number, the output solution will be more accurate, and will cost more time accordingly. s is used to represent the population size.

Second, a number of hybridization is how many genomes that are needed to hybridize. It could be pre-defined by experiment. a is used to represent the number of hybridization.

Third, a number of mutation: how many genomes need to mutate. It could be pre-defined by experiment. We use b to represent the number of mutation.

A genome is a single solution and an array could be used to represent it. The notion of $g_i$ [n] means the $i^{th}$ genome which has n genes. The length of the genome is the total number of applications.

Each cell of the genome is a gene. The notion of $g_i$ [j] means the jth gene in the ith genome. And the value of each cell means which storage pool the current application is mapped to.

The cost function is a critical part of the cost-based reconfiguration process. It determines how to evaluate the cost value of each genome, i.e., the effectiveness of each reconfiguration solution. The key factors would be the performance measures. A quadratic mean deviation of each performance is used measure to evaluate the fitness of each genome.

The cost function could be implemented in various ways, one approach could be:

$$\text{Cost Function} = \sum_{i=1}^{k} \sum_{j=1}^{t} E\{(X_{ji} - E(\overline{X}_{ji}))^2\}$$

where i means the number of different performance measure, j means the number of storage pools or volumes, $X_{ji}$ means the performance value of performance measure i in current solution of storage pool or volume j, and $E(\overline{X}_{ji})$ means the average performance value of the ith performance measure.

Hybridization means that the cost-based reconfiguration process chooses two genomes A and B from current species, and choose a random position to split both A and B. Then there will be four sub-genomes: A', A", B', B". Then, A' with B" and B' with A" are combined to form hybridized genomes A'B" and B'A". A'B" and B'A" are checked to determine if they still fall into the user-defined solution space. An infeasible hybridized genome will be discarded immediately.

Mutation means that the cost-based reconfiguration process chooses genome A and replaces the value of a random position of A with a random value from 1 to m to generate a mutated genome A'. A' is checked to determine if it still falls into the user-defined solution space. An infeasible mutated genome will be discarded immediately.

The cost-based reconfiguration process stops when it reaches one of the following three alternative conditions. First, the cost-based reconfiguration process will run until the cost value doesn't change or the difference is very small (e.g., a predetermined value), which means the best solution is found Second, the cost-based reconfiguration process will run up to a maximum number of generations. Third, the cost-based reconfiguration process will run for a maximum period of time.

FIG. 1 is a block diagram of an example of system architecture and workflow 100 for data-driven online storage resource reconfiguration. A runtime data collection model 110 will query and store storage system performance data by using an API 114 of underlying storage system 116 (1). A performance data display interface 104 queries storage system performance data (2). A system administrator 102 may check the storage system performance by using a performance data display interface 104 (3). Once it is determined that the system needs to be reconfigured, a data-driven online storage pool and volume reconfiguration model 112 obtains the latest storage system performance data from the data collection model 110 (4). The system administrator 102 may input constraints by using a user input constrains interface 106 (5). The user input constraints interface 106 passes the constraints which are defined by system administrator 102 to the data-driven online storage pool and volume reconfiguration model 112 (6). The data-driven online storage pool and volume reconfiguration model 112 generates reconfiguration plans and provide them to a reconfiguration plan display interface 108 (7). The system administrator 102 will be able to see the detailed reconfiguration plans by using a reconfiguration plan display interface 108 (8). The system administrator 102 makes the decision, and return his/her decision to the reconfiguration plan display interface 108 (9). The reconfiguration plan display interface 108 returns the decision of the system administrator 102 to the data-driven online storage pool and volume reconfiguration model 112 (10). If the system administrator 102 decides to reconfigure, the data-driven online storage pool and volume reconfiguration model 112 will call the API 114 of underlying storage system to change the resource allocation scheme (11).

Figure 2:
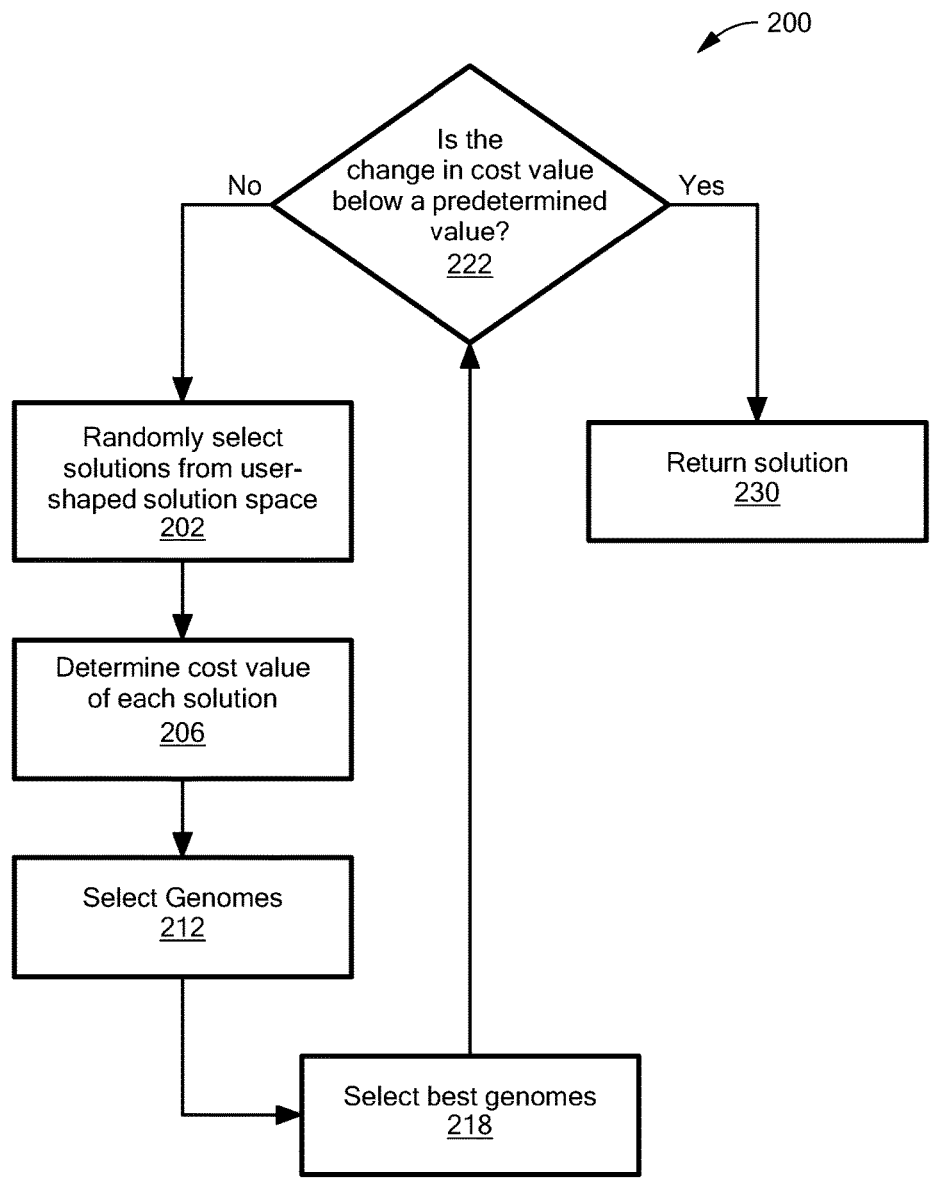
FIG. 2 is a flowchart of an example of a process to determine storage reconfiguration.

Referring to FIG. 2, a process 200 is an example of a process to determine storage reconfiguration. Using process 200 each single reconfiguration solution is treated as a genome (i.e., a different solution is a different combination of the mapping between applications and storage pools) and each application to storage pool/volume mapping is a gene.

Process 200 randomly selects a subset of a certain number of solutions from a user-shaped solution space as a species (202). Process 200 uses a cost function to determine a cost value of each solution subset determined in processing block 202 (206). Process 200 selects the best a of genomes to hybridize, select b of genomes to mutate and puts a and b back to the subset of certain number of solutions (212). Process 200 uses the cost function to determine a cost value of each genome again, sorts them out by their cost value and selects the top genomes as the next generation (218).

Process 200 determines if the change of cost value is below a predetermined value. If it is, process 200 returns a solution (230) and if it is not process 200 repeats processing block 202, 206, 212, 218 and 222.

In one example, there are six applications and three storage pools and the capacity of a storage pool is the single performance measure. The cost value has a score of 55. A first storage pool has a 50 Gb storage capacity and is mapped to a first application with 10 Gb usage and a sixth application with 30 Gb usage. A second storage pool has a 100 Gb storage capacity and is mapped to a second application with 40 Gb usage. A third storage pool has a 200 Gb storage capacity and is mapped to a third application with 80 Gb usage, a fourth application with 80 GB usage and a fifth application with 40 Gb usage. Once the third application reaches its maximum usage of 80 Gb and requires more capacity and third storage pool cannot provide any extra capacity, the system administrator triggers re-configuration by using the process 200, for example. First, the system administrator inputs two constraints. The first constraint is "the fourth application must be put into storage pool 3", and the second constraint is "the capacity in each storage pool should be at the same utilization rate".

The reconfiguration plan will have three solutions. In the first solution, the first storage pool is mapped to the first application and the sixth application, the second storage pool is mapped to the third application and the third storage pool is mapped to the second application, the fourth application and the fifth application. The first solution has a score of 100.

In second solution, the first storage pool is mapped to the second application, the second storage pool is mapped to the fifth application and the sixth application and tine third storage pool is mapped to the first application, the third application and the fourth application. The second solution has a score of 89.

In the third solution, the first storage pool is mapped to the sixth application, the second storage pool is mapped to the second application and the fifth application and the third storage pool is mapped to the first application, the third application and the fourth application. The first solution has a score of 79.

The first solution uses exactly 80% of the total capacity in each storage pool, and the second and third plans use approximately 80% of its total capacity. All three of the reconfiguration plans satisfy the constraints. As a result, the plan 1 is selected.

Figure 3:
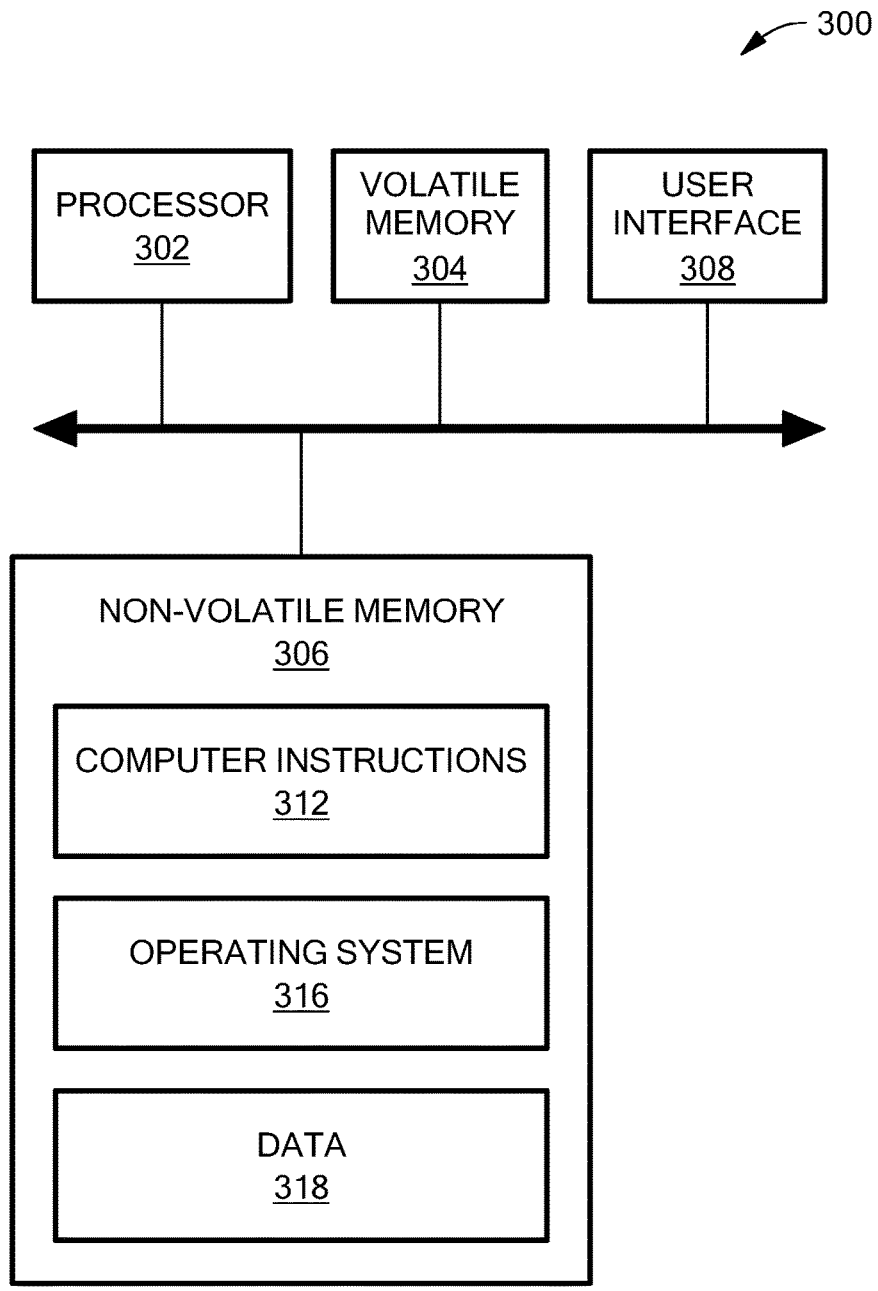
FIG. 3 is a simplified block diagram of an example of a computer on which some or all of the process of FIG. 2 may be implemented.

Referring to FIG. 3, in one example, a computer 300 includes a processor 302, a volatile memory 304, a non-volatile memory 306 (e.g., hard disk) and the user interface (UI) 308 (e.g., a graphical user interface, a mouse, a keyboard, a display, touch screen and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 200).

The processes described herein (e.g., process 200) are not limited to use with the hardware and software of FIG. 3; they may find applicability in any computing or processing environment and with any type of machine or set of machines that is capable of running a computer program.

The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 200 is not limited to the specific processing order of FIG. 2. Rather, any of the processing blocks of FIG. 2 may be combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

What is claimed is:

1. A method comprising:
   performing a reconfiguration process to reconfigure storage usage, the reconfiguration process comprising
   randomly selecting as an initial generation, a subset of solutions from a user-shaped solution space;
   determining a cost value of each solution in the subset using a cost function, the cost function computing a cost value for each respective solution in the subset, the cost value providing a measure of the effectiveness of each respective solution at least in meeting one or more requirements of the user-shaped solution space;
   generating one or more cost-based reconfiguration solutions based on a customized genetic process, where each reconfiguration solution is treated as a genome, the generating comprising:
   selecting a first two or more genomes to hybridize, the hybridizing comprising splitting each of the first two genomes into four sub-genomes that are recombined into a first one or more pairs of hybridized genomes; and
   selecting a second genome to mutate, the mutating comprising replacing a value of a random position of the genome with a random value to create a first mutated genome;
   adding the one or more pairs of hybridized genomes and the second mutated genome into the subset of solutions; and
   determining a new cost value for each hybridize and mutated genome using the cost function,
   selecting genomes using the cost function, to serve as a next generation;
   repeating the determining, generating, and selecting, using each successive next generation, until at a predetermined condition is met; and
   returning as a solution, the genome from the most recent next generation having the best cost value.

2. The method of claim 1, wherein the user-shaped solution space is defined as an original solution space excluding solutions violating user-defined constraints.

3. The method of claim 1, wherein performing a reconfiguration process to reconfigure storage usage comprises performing a reconfiguration process to reconfigure one of storage pools or volumes.

4. The method of claim 1, wherein determining the cost value of each solution in the subset using a cost function comprises determining the cost value of each solution in the subset using a cost function comprising:

$$\text{Cost Function} = \Sigma_{i=1}^{k} \Sigma_{j=1}^{l} E\{(X_{ji} - E(\overline{X}_{ji}))^2\},$$

where i means the number of different performance measures, j means the number of storage pools or volumes, $X_{ji}$ means the performance value of performance measure i in current solution of storage pool or volume j, and $E(\overline{X}_{ji})$ means the average performance value of the ith performance measure.

5. The method of claim 1, wherein the randomly selected subset of solutions comprises a species and wherein selecting genomes to hybridize comprises:
   selecting the first two or more genomes from a current species; and
   selecting a random position to split the two selected genomes to form the four sub-genomes.

6. The method of claim 1, wherein selecting the second genome to mutate comprises:
replacing the value of the random position of the genome with a random value from 1 to m to generate a mutated genome.

7. The method of claim 1, wherein the predetermined condition comprises one of:
the cost value does not change or the difference is a predetermined value;
the reconfiguration process has run a predetermined amount of times; or
the reconfiguration process has run a predetermined period of time.

8. The method of claim 1, wherein generating one or more cost-based reconfiguration solutions further comprises discarding, if necessary, at least one of an infeasible hybridized genome and an infeasible mutated genome, wherein the discarded respective infeasible hybridized genome or infeasible mutated genome falls outside the user-defined solution space.

9. An apparatus, comprising:
electronic hardware circuitry configured to perform a reconfiguration process to reconfigure storage usage, the electronic hardware circuitry comprising at least one of a processor, a programmable logic device, and a logic gate;
a non-volatile memory in operable communication with the electronic hardware circuitry and storing computer program code that when executed on the electronic hardware circuity causes the electronic hardware circuitry to perform the reconfiguration process and operable to execute the operations of:
randomly selecting, as an initial generation, a subset of solutions from a user-shaped solution space;
determining a cost value of each solution in the subset using a cost function, the cost function computing a cost value for each respective solution in the subset, the cost value providing a measure of the effectiveness of each respective solution at least in meeting one or more requirements of the user-shaped solution space;
generating one or more cost-based reconfiguration solutions based on a customized genetic process where each reconfiguration solution is treated as a genome, the generating comprising:
selecting a first two or more genomes to hybridize, the hybridizing comprising splitting each of the first two genomes into four sub-genomes that are recombined into a first one or more pairs of hybridized genomes; and
selecting a second genome to mutate, the mutating comprising replacing a value of a random position of the genome with a random value to create a first mutated genome;
adding the one or more pairs of hybridized genomes and the second mutated genome into the subset of solutions; and
determining a new cost value for each hybridize and mutated genome using the cost function
selecting genomes, using the cost function, to serve as a next generation; and
repeating the determining, generating, and selecting, using each successive next generation, until a predetermined condition is met; and
returning as a solution the genome from the most recent next generation having the best cost value.

10. The apparatus of claim 9, wherein:
the user-shaped solution space is defined as an original solution space excluding solutions violating user-defined constraints, and
wherein performing a reconfiguration process to reconfigure storage usage comprises performing a reconfiguration process to reconfigure one of storage pools or volumes.

11. The apparatus of claim 9, wherein the computer program code is operable to determine a cost value of each solution in the subset using a cost function comprising:

$$\text{Cost Function} = \Sigma_{i=1}^{k} \Sigma_{j=1}^{l} E\{(X_{ji} - E(\overline{X}_{ji}))^2\},$$

where i means the number of different performance measure, j means the number of storage pools or volumes, $X_{ji}$ means the performance value of performance measure i in current solution of storage pool or volume j, and $E(\overline{X}_{ji})$ means the average performance value of the ith performance measure.

12. The apparatus of claim 9, wherein the randomly selected subset of solutions comprises a species and wherein the computer program code for selecting genomes to hybridize comprises computer program code operable to execute the operations of:
selecting the first two genomes from a current species; and
selecting a random position to split the two selected genomes to form the four sub-genomes.

13. The apparatus of claim 9, wherein the computer program code for selecting a second genome to mutate computer program code operable to execute the operations of:
replacing a value of a random position of the genome with a random value from 1 to m to generate a mutated genome.

14. The apparatus of claim 9, wherein the predetermined condition comprises one of:
the cost value does not change or the difference is a predetermined value;
the reconfiguration process has run a predetermined amount of times; or
the reconfiguration process has run a predetermined period of time.

15. An article comprising:
a non-transitory computer-readable medium that stores computer-executable instructions, the instructions causing a machine to perform a reconfiguration process to reconfigure storage usage, the instructions causing a machine to perform the reconfiguration process comprising instructions causing a machine to:
randomly select, as an initial generation, a subset of solutions from a user-shaped solution space;
determine a cost value of each solution in the subset using a cost function, the cost function computing a cost value for each respective solution in the subset, the cost value providing a measure of the effectiveness of each respective solution at least in meeting one or more requirements of the user-shaped solution space;
generate one or more cost-based reconfiguration solutions based on a customized genetic process where each reconfiguration solution is treated as a genome, wherein the generating comprises:
selecting a first two or more genomes to hybridize, the hybridizing comprising splitting each of the first two genomes into four sub-genomes that are recombined into a first one or more pairs of hybridized genomes, and selecting a second genome to mutate, the mutating comprising replacing a value of a random position of the genome with a random value to create a first mutated genome;

adding the one or more pairs of hybridized genomes and the second mutated genome into the subset of solutions; and determining a new cost value for each hybridize and mutated genome using the cost function.

select genomes, using the cost function, to serve as a next generation; and repeat the determining, generating, and selecting, using each successive next generation, until a predetermined condition is met; and executing returning as the solution a genome from the most recent next generation having the best cost value.

16. The article of claim 15, wherein the user-shaped solution space is defined as an original solution space excluding solutions violating user-defined constraints, and wherein performing a reconfiguration process to reconfigure storage usage comprises performing a reconfiguration process to reconfigure one of storage pools or volumes.

17. The article of claim 15, wherein the instructions causing the machine to determine the cost value of each solution in the subset using a cost function comprise instructions causing the machine to determine the cost value of each solution in the subset using a cost function comprising:

$$\text{Cost Function} = \Sigma_{i=1}^{k} \Sigma_{j=1}^{l} E\{(X_{ji} - E(\overline{X}_{ji}))^2\},$$

where i means the number of different performance measures, j means the number of storage pools or volumes, $X_{ji}$ means the performance value of performance measure i in current solution of storage pool or volume j, and $E(\overline{X}_{ji})$ means the average performance value of the ith performance measure.

18. The article of claim 15, wherein the randomly selected subset of solutions comprises a species and:

wherein the instructions causing the machine to select a first two or more genomes to hybridize comprise instructions causing the machine to:

select the first two genomes from a current species;

select a random position to split the two selected genomes to form the four sub-genomes; and combine the four sub-genomes to form two hybridized genomes; and wherein the instructions causing the machine to select the genome to mutate comprises instructions causing the machine to:

replace a value of a random position of the genome with a random value from 1 to m to generate a mutated genome.

19. The article of claim 15, wherein the predetermined condition comprises one of:

the cost value does not change or the difference is a predetermined value;

the reconfiguration process has run a predetermined amount of times; or the reconfiguration process has run a predetermined period of time.

20. The article of claim 15, wherein the instructions causing the machine to generate a cost-based reconfiguration solution comprise instructions causing the machine to discard, if necessary, at least one of an infeasible hybridized genome and an infeasible mutated genome, wherein the discarded respective infeasible hybridized genome or infeasible mutated genome falls outside the user-defined solution space.

* * * * *